United States Patent
Burrows (10) Patent No.: US 6,377,530 B1
(45) Date of Patent: Apr. 23, 2002

(54) SYSTEM AND METHOD FOR PLAYING COMPRESSED AUDIO DATA

(75) Inventor: Michael Burrows, Palo Alto, CA (US)

(73) Assignee: Compaq Computer Corporation, Houston, TX (US)

(*) Notice: Subject to any disclaimer, the term of this patent is extended or adjusted under 35 U.S.C. 154(b) by 0 days.

(21) Appl. No.: 09/249,182

(22) Filed: Feb. 12, 1999

(51) Int. Cl.[7] ............................................. G11B 3/90
(52) U.S. Cl. .................. 369/59.21; 369/47.1; 369/30.3; 704/500; 84/609
(58) Field of Search .......................... 369/54, 32, 48, 369/33, 47, 59, 58, 59.21, 59.23, 30.03, 32.01, 30.06, 47.1; 704/500, 501, 502; 84/609

(56) References Cited

U.S. PATENT DOCUMENTS

| | | | | |
|---|---|---|---|---|
| 5,870,710 A | * | 2/1999 | Ozawa et al. ............... | 704/500 |
| 5,986,200 A | * | 11/1999 | Curtin ........................ | 84/609 |
| 6,067,279 A | * | 5/2000 | Fleming, III ................. | 369/32 |
| 6,076,063 A | * | 6/2000 | Unno et al. .................. | 704/500 |
| 6,122,230 A | * | 9/2000 | Scibora ....................... | 369/32 |

* cited by examiner

Primary Examiner—David Hudspeth
Assistant Examiner—Kim-Kwok Chu
(74) Attorney, Agent, or Firm—Pennie & Edmonds LLP (57) ABSTRACT

A portable audio player stores a large amount of compressed audio data on an internal disk drive, and loads a portion of this into an internal random access memory (RAM) which requires less power and less time to access. The audio player plays the data stored in RAM and monitors the amount of unplayed data. When the amount of unplayed data falls below a threshold, additional data is copied from the disk drive into RAM. When the portable audio player is turned off, a predetermined amount of audio data is stored in a fast-access non-volatile flash memory unit. When the audio player is turned back on, and play is resumed, a suitable portion of this data can be played while data is being loaded from the disk drive into RAM, thus reducing the amount of time a user must wait before receiving data in response to a play request.

21 Claims, 4 Drawing Sheets

ROM

| User interface | ~160 |
| --- | --- |
|    Display Control | ~162 |
|    Track Selection | ~164 |
| Play | ~166 |
| Decompression Proc | ~168 |
| Power Down | ~170 |
| Power Up | ~172 |
| Power Up / Fast-Start | ~174 |
| Rew | ~176 |
| Fwd | ~178 |
| Scan | ~180 |
| ... | |

FIG. 2B

RAM

| Play State Information | ~196 |
| --- | --- |
|    Play List | ~190 |
| Table of Contents | ~194 |
| ... | |
| N Minutes of Audio Data | ~192 |

FIG. 2C

Flash Memory

| Play State Information | ~204 |
| --- | --- |
| Partial Table of Contents | ~202 |
| ... | |
| M Seconds of Audio Data | ~200 |

SYSTEM AND METHOD FOR PLAYING COMPRESSED AUDIO DATA

The present invention relates generally to a system and method for decreasing the amount of time necessary to resume playing audio data from a portable audio player following a play stoppage.

BACKGROUND OF THE INVENTION

Since the advent of the audio cassette, portable audio players have enjoyed widespread popularity. Portable audio players allow a user to listen to audio data in virtually any setting by freeing the user from the mobility constraints imposed by bulky home-based stereo systems. Because portable audio players are often used in manner that makes connection to an external power supply impractical, portable audio players typically rely on batteries to provide power. Since such batteries have a limited lifetime, it is desirable for the audio player to consume as little power as possible. In addition, because portable audio players are often physically carried by the user, it is desirable to make the portable audio player's batteries small and lightweight.

Current portable audio players play digital audio data stored on a compact disk, or CD, which is manually loaded into the player by the user. CDs are capable of storing more data than cassette tapes and are less susceptible to degradation resulting from repeated use. In addition, CDs allow the user to jump quickly and automatically to different tracks of data, unlike cassette tapes, which require a magnetic tape to be physically spooled to the desired location, and typically do not contain indexing information to indicate where new tracks begin.

However, while CDs represent an improvement over audio cassette tapes, CDs still suffer from a limited amount of storage. For example, most present-day CDs are capable of storing at most 70 to 75 minutes of audio data. Moreover, many of the CDs that a user owns will contain even less data than this, since separate CDs are typically used to record separate programs and events. Even with the advent of the digital video disk, or DVD, with a much greater storage capacity than a traditional CD, it will typically be the case that a user will own a library of many different disks, each containing its own unique set of data. Thus, to listen to several hours of audio data, or to listen to a variety of programs, a user must carry several CDs and manually load the next CD into the player when the previous CD is finished playing. In addition, since CDs are relatively large, they require a relatively large portable unit to contain them. Another disadvantage of CDs is that the manner in which data is read from the disks is sensitive to physical shocks, which can cause undesirable discontinuities, or skips, in the audio output. In addition, power is consumed by continuously spinning the compact disk to obtain data.

The development of effective compression techniques has enabled a greater quantity of audio data to be stored in a much smaller amount of memory. For example, the MPEG audio layer 3 compression format, or MP3, is able to compress CD-quality digital audio data by a factor of about ten, and thus enables a CD-quality audio signal to be delivered at a data rate of 128 kilobits per second. As a result, these compression techniques make it practical for a compressed audio player to use storage media other than traditional cassettes or disks—media that would otherwise be prohibitively expensive to use. For example, the Rio MP3 Software Player, made be Diamond Multimedia, stores data in a 32 megabyte flash memory, a type of non-volatile electronic memory that allows for writing and erasing of data. By making use of compression techniques, a user can thus store approximately 30 minutes of audio data in the flash memory, whereas without compression, only about 3 minutes of audio data could be stored. However, current flash-memory-based portable audio players are only able to store about half as much data as a typical CD. As a result, whenever the user wants to listen to the data stored on a different CD, the user must manually copy that CD into the flash memory, a process which is much more time-consuming and cumbersome than simply loading a new CD into a traditional portable CD player. Although a flash memory can store additional audio data if a higher compression rate is used, higher compression rates can cause undesirable degradation of the audio data. In addition, flash memory is subject to fatigue, and will wear out after repeated write-erase cycles.

What is needed, then, is a portable player that makes use of a compact, high-capacity non-volatile storage medium, thus allowing the user to listen to a virtually unlimited supply of audio data without having to physically insert or copy additional data into the portable player's memory. While non-volatile magnetic media, such as the hard disk drives used in portable computers, have a large storage capacity, the amount of power that these hard disk drives consume makes them impractical for use in a portable audio player, which would either have to include an undesirably large battery, or have an undesirably short playtime. For example, while the 2.5" disk drives used in laptop computers are designed to consume relatively little power, their power consumption is still much greater than that which is acceptable in a typical CD-based portable audio player. Whereas a portable audio player may have a total battery weight of about 2 ounces, a laptop computer may have a battery weight of more than a pound. Thus, if a portable audio player were to use a hard disk in the same manner as a laptop computer, the battery life of the portable audio player would be prohibitively short.

Moreover, if the hard disk were turned off to conserve power, it would take a relatively long time to access data at a random location on the hard disk in comparison to the time necessary to access random data on a flash memory or CD. More specifically, from a powered off state, it typically takes three to six seconds to "spin up" and begin accessing data at a specified disk location. As a result, powering off the hard disk to conserve power would cause an undesirable delay between a user's request for audio data and the actual delivery of that data to the user.

Accordingly, it is an object of the present invention to provide a system and method for storing a large volume of audio data in a portable audio player. It is another object of the present invention to provide a system and method for reducing the power consumed by a portable audio player, while minimizing the delay between a user's request for audio data and the delivery of that audio data. Yet another object of the present invention is to provide a system and method for providing continuous, uninterrupted audio data to the listener.

SUMMARY OF THE INVENTION

A portable audio player includes a disk storage unit, a volatile memory buffer, and fast-access non-volatile memory buffer. Fast-start logic copies a predefined amount of compressed audio data from the disk storage unit or the volatile memory buffer into the non-volatile memory buffer when the portable audio player is commanded to stop playing or to power down. The fast-start logic plays the compressed audio data in the non-volatile memory buffer when the portable audio player is commanded to resume playing.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

The following embodiments of the present invention will be described in the context of a portable audio player used to play compressed audio data, although those skilled in the art will recognize that the disclosed systems and methods are readily adaptable for broader application. For example, without limitation, the present invention could be readily applied in the context of a video, multimedia, or uncompressed audio player.

The present invention enables a portable audio player to store a large amount of data while maintaining an acceptable level of power consumption and an optimal data retrieval time. The portable audio player stores a large amount of compressed audio data on an internal, non-volatile storage medium, such as a hard disk drive, and loads a portion of this into a volatile storage medium, such as random-access memory (RAM) which requires less power and less time to access. The audio player plays the data stored in the volatile storage medium while keeping track of the amount of playtime associated with the remaining, unplayed data. Once the remaining playtime decreases to a predetermined level, additional data is copied from the non-volatile storage medium into the volatile storage medium. Because the time necessary to copy a block of data from the non-volatile storage medium to the volatile storage medium is much less than the amount of time it takes to play the same block of audio data, this approach minimizes the amount of time that the non-volatile storage medium must be operated, and thus minimizes the amount of power consumed by the system.

In addition, when the portable audio player is turned off, a predetermined amount of audio data is stored in a fast-access non-volatile storage unit, such as flash memory. When the audio player is turned back on, and play is resumed, a suitable portion of this data can be played while data is being loaded from the main non-volatile storage unit into the volatile storage unit, thus reducing the amount of time a user must wait before receiving data in response to a play request.

Figure 1:
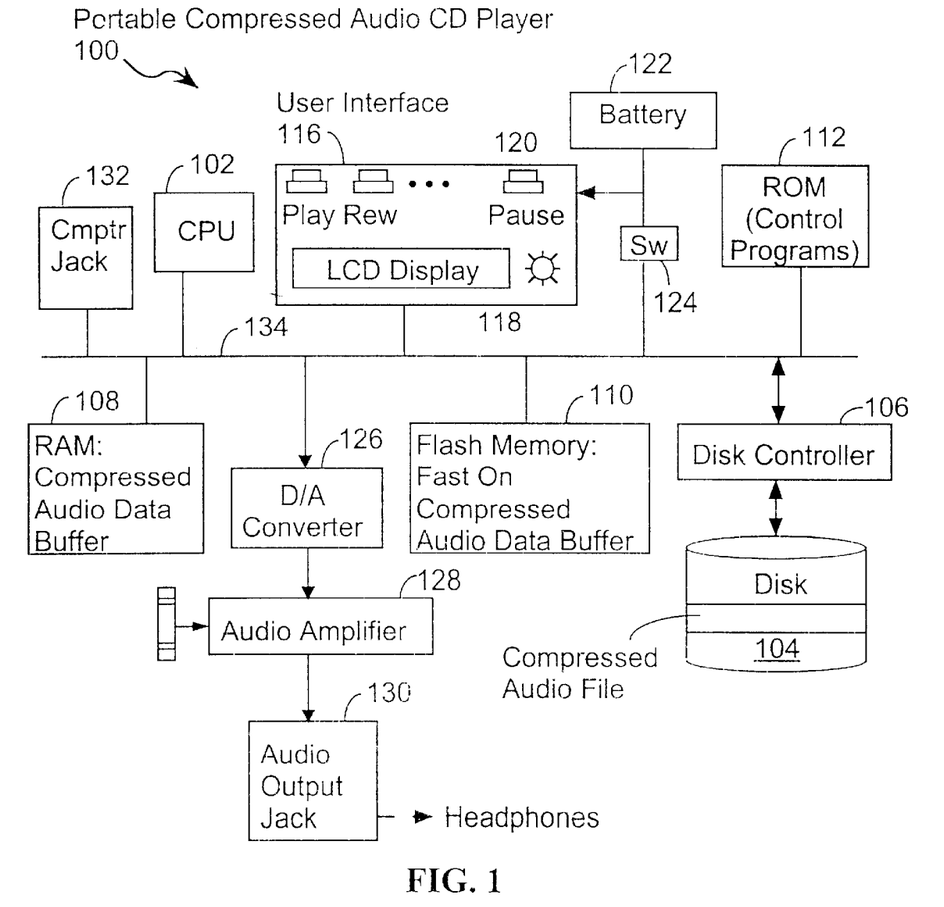
FIG. 1 is a block diagram of a portable audio player system in accordance with the present invention.

FIG. 1 shows an implementation of the portable audio player 100 that preferably includes:

- a data processor 102;
- a main non-volatile storage unit 104, preferably a hard disk drive having an associated disk controller 106;
- a volatile storage unit 108, preferably random access memory (RAM);
- a fast-access non-volatile storage unit 110, preferably a flash memory array;
- a control memory module 112, preferably read only memory (ROM), which stores the control programs for the system;
- a user interface 116 that includes a display 118 and one or more buttons 120 or other user input devices;
- a power supply 122, preferably a battery;
- a switch 124 for delivering power from the battery to the system and for shutting power off when the system is powered down;
- a digital to analog data converter 126;
- an audio amplifier 128;
- an audio output jack 130 that can be used to deliver an analog audio signal to a pair of headphones or another audio output device;
- a jack 132 for coupling the system to a computer (not shown), such as for downloading compressed audio data onto the hard disk 104; and
- one or more internal buses 134 for interconnecting the aforementioned elements of the system.

To play audio data via the audio output jack 130, it is necessary for processing unit 102 to decompress a portion of the audio data stored in RAM 108. Once the compressed audio data has been decompressed, it is sent via bus 134 to the digital-to-analog converter 126 which converts the digital audio data to an analog audio signal. This audio signal is then sent to one or more audio amplifiers 128 before being delivered to the audio output jack 130.

In a preferred embodiment, the hard disk 104 is preferably a compact device, such as 2.5" diameter or smaller hard disk device, that includes at least four gigabytes of storage. Four gigabytes of non-volatile disk storage enables the system 100 to store over 65 hours of MP3 compressed audio data. The compressed audio data is preferably received, via the jack 132, from a host computer that compresses the audio data from audio CDs. One of ordinary skill in the art will recognize that any suitable non-volatile storage medium could be used in place of the hard disk used in the preferred embodiment.

Figure 2A:
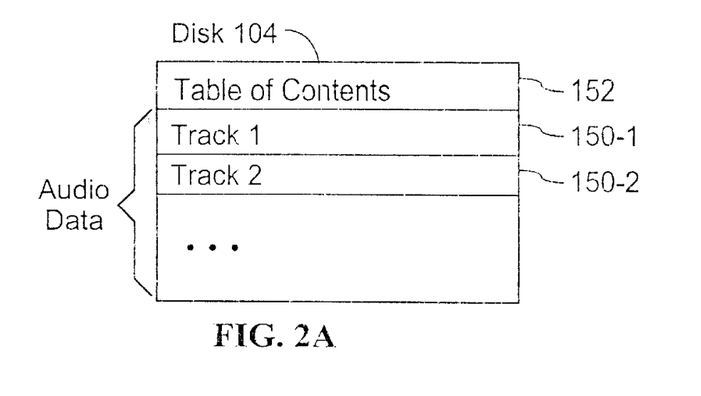
FIGS. 2A, 2B, 2C and 2D are block diagrams of the contents of the memory units contained in a system according to the present invention.

Each "track" of each audio CD may be stored as a separate file 150 (FIG. 2A) on the hard disk 104. Referring to FIG. 2A, a table of contents 152 is stored on the hard disk 104. The table of contents, which is composed by the host computer, preferably organizes the compressed files in a hierarchy. For example, the top level could contain music genres such as classical, jazz, country, rock, light rock, and so on. Only music genres for which at least one CD or at least one track has been stored on the hard disk are included in the table of contents. At the second level, within each genre, is a listing of the CDs for which music is stored on the hard disk. At the third level is stored the names of the tracks for each CD stored on the hard disk. If the user has selected individual tracks for storage on the system 100, instead of entire CDs, the second level may reference user specified "pseudo-CDs." The table of contents also includes information about the disk storage location of each track.

The table of contents 152 can be viewed on the display 118, and the user can select CDs and/or individual tracks to be played. User selections are added to a "play list" 190 (FIG. 2B). which is a queue of tracks to be played by the system.

The host computer, when coupled to the system 100 via the jack 132, can access the table of contents 152, delete entire CDs and/or tracks stored on the hard disk 104, download additional CDs and/or tracks onto the hard disk 104, and replace or update the table of contents 152.

Figure 2B:
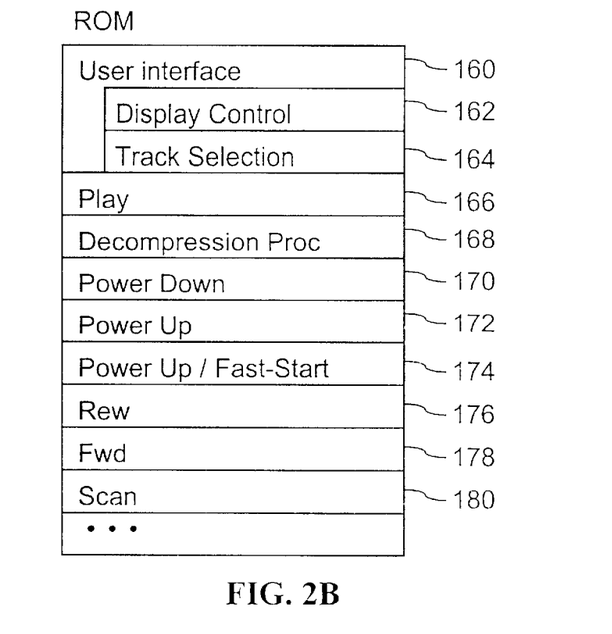

Referring to FIGS. 1 and 2B, the control logic of the system 100 is implement primarily in the form of control programs that are executed by the system's data processor 102. The system's control programs may be stored in read-only memory (ROM) 112. In a typical implementation, the control programs stored in the ROM will include:

- a set of user interface procedures 160, including a display control procedure 162 for displaying user selected portions of the table of contents, and track selection procedures 164 for enabling the user to select audio tracks to be played;
- a play procedure 166, discussed in more detail below, for controlling the playing of audio tracks;
- a decompression procedure 168 for decompressing compressed audio data;
- a power down procedure 170, discussed in more detail below, for powering down the system and enabling the fast-start feature of the present invention;
- a power up procedure 172 for turning on the system and for invoking the power up fast-start procedure 174 when appropriate; as well as
- other control procedures for implementing such features as fast forward 176, rewind 178, track scanning 180 and the like.

One of ordinary skill in the art will recognize that in an alternate embodiment, the control logic could readily be implemented with a custom-made chip, rather than with software operating in conjunction with a general-purpose processor 102.

Figure 2C:
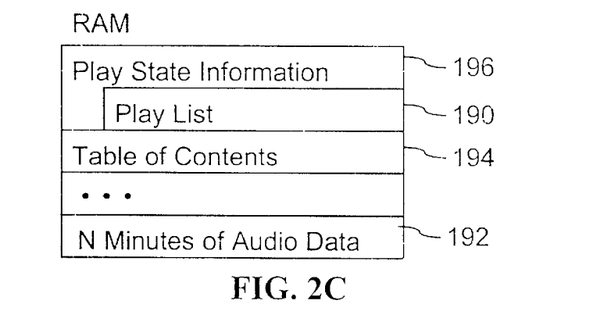

FIG. 2C shows a memory-map for RAM 108 in accordance with one embodiment of the present invention. A portion of RAM 108 is devoted to storing a predetermined amount of compressed audio data 192. In addition, RAM 108 preferably stores a copy 194 of the table of contents (copied from the hard disk) and play state information 196. The play state information 196 indicates the state of the portable audio player 100, for example, information regarding the amount of unplayed data stored in RAM, and the playing mode of the device (e.g., fast-forward, normal play, rewind, etc.). The play state 196 also includes a "play list" 190, which is a list of audio tracks to be played.

Figure 2D:
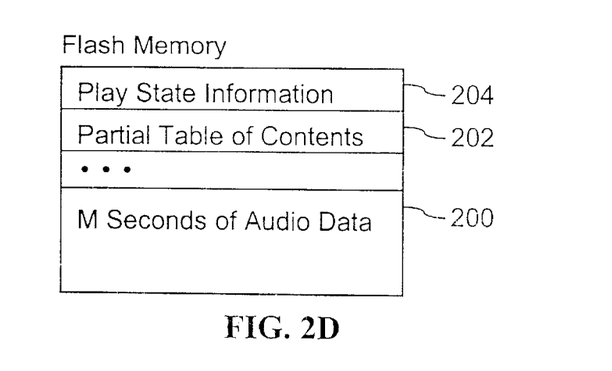

FIG. 2D shows a memory map for flash memory 110 in accordance with an embodiment of the present invention. Flash memory 110 stores a predetermined amount of compressed audio data 200. In addition, flash memory 110 preferably includes a table of contents 202 indicating the location and identity of data within flash memory, and a play state table 204 which stores, for example, information regarding the play state of the audio player just prior to the device being powered down.

Power Conserving Play Logic

The operation of the portable audio player 100 will now be described with reference to FIG. 3, which is a flow chart of a preferred method of playing audio data in accordance with the present invention. Data is played by continuously reading it from RAM 108, decompressing it, converting it into an analog audio signal, and sending it to the output jack 130 (220). The rate at which the data is read from RAM 108 is dictated by the application. For example, MP3 compressed audio data is typically played at a rate of 128 Kilobits per second.

Play control logic monitors (222) the amount of data that remains in RAM (or equivalently, it monitors the amount of playtime associated with the unplayed data in RAM). To ensure that there is no undesirable break in the audio output, when the playtime associated with the data stored in RAM falls below a predetermined threshold (sometimes called the low water mark), the play control logic determines whether, and how much, additional data will be required by RAM 108, and initiates the transfer of additional data from disk 104 to RAM 108 (224). To transfer data from disk 104 to RAM 108, the play control logic powers on the hard disk, copies data to RAM 108, then powers off the disk 104. The threshold at which data will be copied from disk 104 to RAM 108 will depend on the playtime of the data remaining in RAM 108 and the time required to access disk 104 and transfer data to RAM 108. To ensure that an undesirable break in the audio output does not occur, the threshold should be chosen so that RAM 108 does not run out of data to play before additional data is copied into it from the disk 104. In addition, by playing data directly from RAM 108, rather than from disk 104, undesirable skips in the audio output are avoided, since reading data from RAM 108 is typically not dependent on moving parts that are sensitive to physical jarring.

To minimize power consumption, the frequency and duration of accesses to disk 104 should be minimized. Thus, it is desirable to power on the disk just long enough to copy data into RAM 108, and to play as much of the data stored in RAM as is practical before copying additional data from disk 104. In addition, it is desirable for RAM 108 to contain a relatively large amount of memory. Preferably, the ratio of (a) the time necessary to play the data stored in RAM 108, to (b) the time necessary to copy data from disk 104 into RAM 108 will be greater than five-to-one, and in a preferred embodiment this ratio is approximately sixty-to-one. In any event, the ratio should be at least two-to-one, although any suitable ratio could be chosen in accordance with the principles of the present invention.

For example, in one embodiment of the present invention a 10 megabyte RAM is used in conjunction with a 4 gigabyte hard disk drive with an access time of 5 seconds. Thus, if 128 kilobits of compressed audio data are played every second, RAM will contain approximately 10 minutes of compressed audio data and disk 104 will contain approximately 65 hours of compressed audio data. Assuming it takes 5 seconds to power on the hard disk and an additional 5 seconds to copy 10 megabytes of compressed audio data from the hard disk to RAM, then the system must allow at least 10 seconds to access the disk and copy data to RAM in order to ensure that RAM does not run out of data to play. Thus, for example, a threshold of 20 or 30 seconds could be used in this embodiment. Since disk 104 is only powered on for 10 seconds every 10 minutes of play time, power consumption is minimized.

Of course, the play time associated with the stored audio data will be smaller if the portable audio player 100 is operated in a play mode such as fast-forward. However, this can readily be accounted for by simply initiating access to disk 104 sooner, thereby insuring that RAM 108 will not run out of data to play. In addition, in one embodiment, play control logic will not completely overwrite the data in RAM with data from disk 104 once the threshold is reached. Instead, the final portion of the previously-played data will be retained in case the user wishes to reverse the direction of play. Thus, in this embodiment, the amount of data comprising this final portion would be at least as great as the rewind speed multiplied by the amount of time it takes to access disk 104 and copy data from disk 104 to RAM 108.

When the amount of data remaining in RAM 108 falls below the threshold, but the play list is empty (226), the play procedure stops when the data in RAM 108 is exhausted (228). Further, the last transfer of data from disk 104 to RAM 108, when the play list is exhausted, may only partially fill the RAM 108 with audio data (224).

Fast Start Logic

Figure 4:
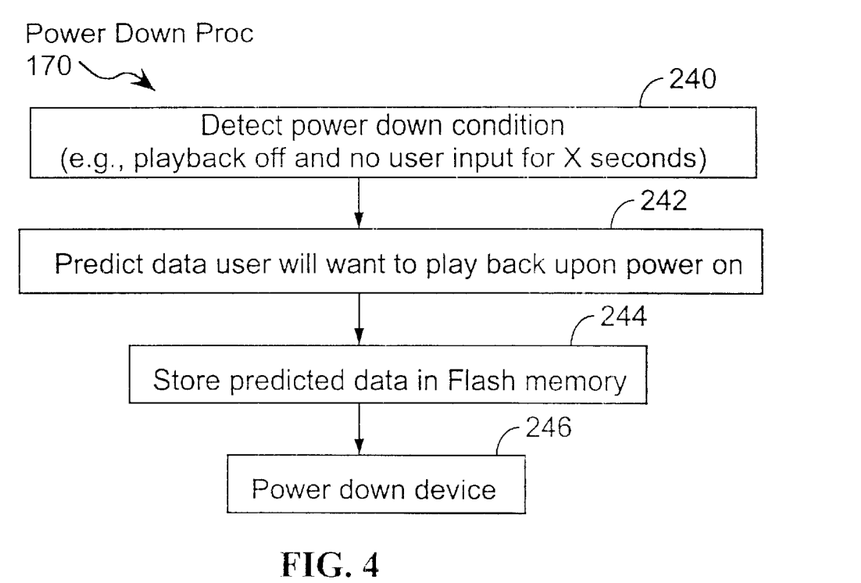
FIG. 4 is a flow chart illustrating a method of powering down a portable audio player in accordance with an embodiment of the present invention.
Figure 5:
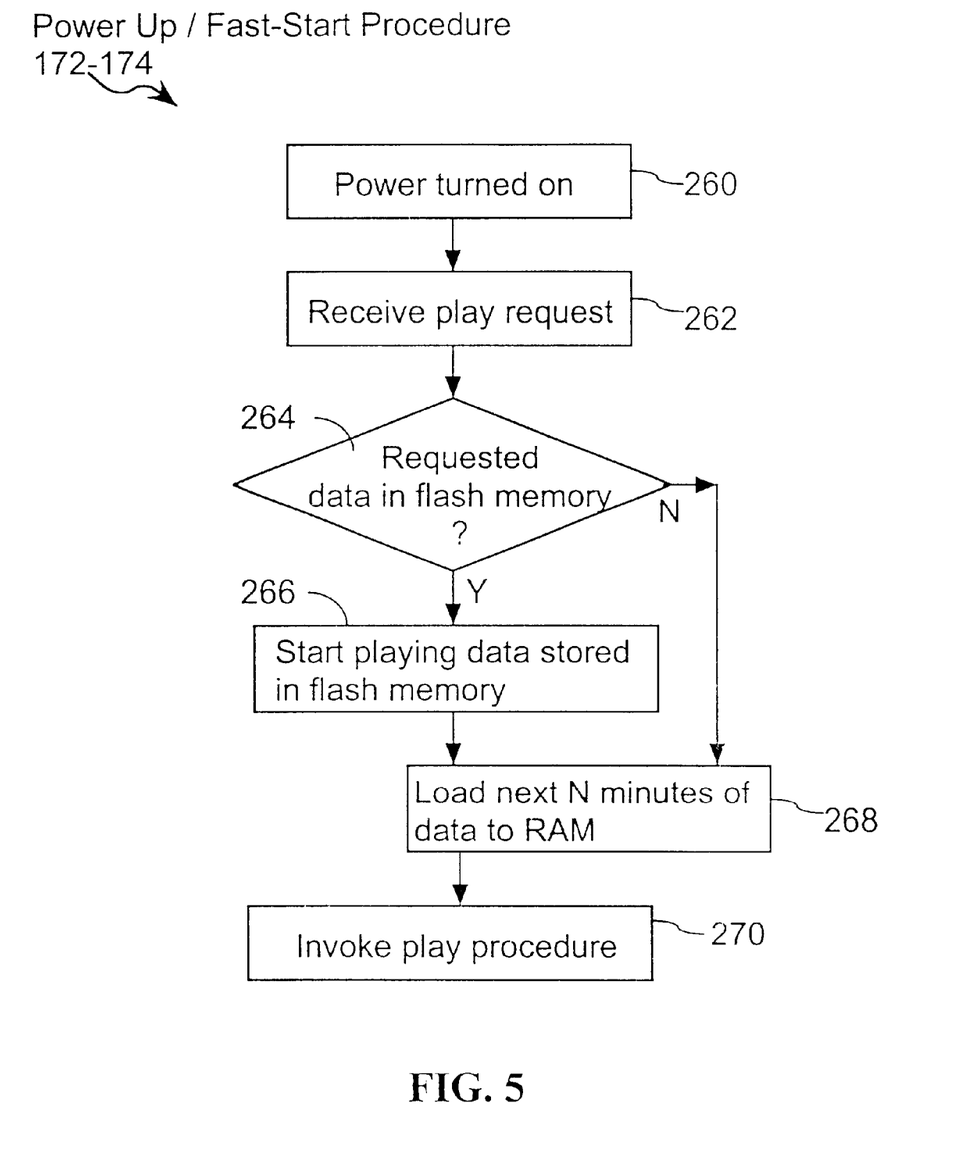
FIG. 5 is a flow chart showing a method for powering up a portable audio player in accordance with an embodiment of the present invention.

Referring now to FIGS. 4 and 5, a preferred method for reducing restart latency will be discussed. FIG. 4 is a flow chart of a preferred method for powering down the portable audio player 100. The power down sequence shown in FIG. 4 can be initiated in a variety of ways. For example, a user can command the system to power down by pressing appropriate buttons on the user interface. In addition, power down can be initiated when the control logic detects a predefined power down condition (240). In a preferred embodiment, one predefined power down condition is (A) data is not being played, and (B) no user input has been received for a predefined period of time (e.g., 30 seconds).

Once a power down command is received or generated, the power down method shown in FIG. 4 is initiated. First, the control logic makes a prediction regarding the data that the user will want to access once the unit is turned back on (242). This prediction could be quite simple, consisting of, for example, the next portion of data starting from where the user left off, or could be more complex, consisting of several predictions regarding what the user may desire next, such as the beginning of the user's favorite tracks, as determined by frequency of play. In addition, some or all of these predictions could be made at the time the player is turned off, or, alternatively, could be made in advance. Moreover, it should be understood that these exemplary predictions are provided for illustration only, as one of ordinary skill in the art will recognize that any suitable prediction or group of predictions could be used in accordance with the present invention.

Once a prediction or group of predictions is obtained, the control logic copies blocks of data from the predicted areas of RAM 108 or disk 104 (or both) into flash memory 110 (244). Preferably, the size of these blocks will be large enough so that the playtime associated with each block will be greater than the amount of time it takes to copy data from disk 104 to RAM 108, thus preventing undesirable gaps in play when play is restarted. Once the desired blocks of data have been copied into the flash memory 110, the audio player is powered down (246). In one embodiment, power is removed from the audio player by deactivating switch 118. When power is removed from the portable audio player 100, the data stored in volatile memory, such as RAM 108, will be lost. However, data stored in non-volatile memory, such as disk 104 and flash memory 110, will remain stored.

FIG. 5 is a flow chart of a procedure followed by an exemplary embodiment of the present invention when the audio player is turned back on. When power is turned on (step 260), the audio player waits for the user to request data, such as by pressing the play button on user interface 116. When a command to resume play is received (step 262), the play control logic checks the table of contents stored in flash memory 110 to determine whether the beginning of the data the user has requested to be played corresponds to the data stored in flash memory 110 (step 264). In some embodiments, the system may be turned on by pressing the system's play button, in which case the resume play command is received immediately. If the system was previously in the middle of playing a track when it was shut down, the flash memory will contain data for a next portion of that track. If the system was not playing a track when it was shut down, the flash memory may contain data for the track last shown on the user display, or other data.

If the beginning of the requested data is stored in the flash memory 110, then the play control logic plays that data (266) by reading it from the flash memory, decompressing it, and sending it to audio output jack 130 via digital-to-analog converter 126 and audio amplifier 128. In one embodiment, data in the flash memory 110 is copied to RAM before it is played. This copying step is fast and not noticeable to the end user.

Figure 3:
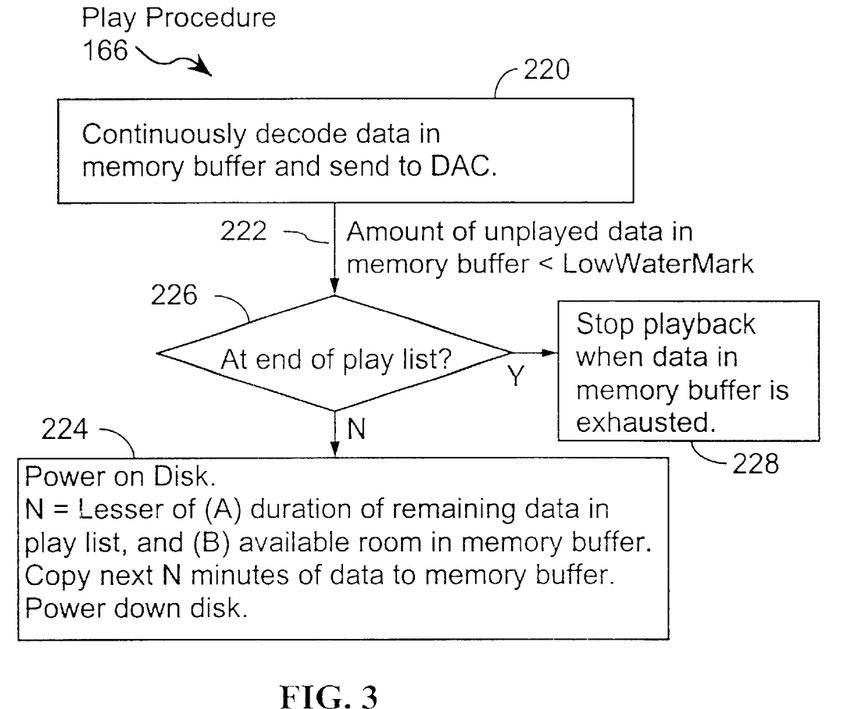
FIG. 3 is a flow chart of a method of playing data in one embodiment of the present invention.

Preferably, at the same time that the requested data is being played from flash memory 110, the next portion of data responsive to the user's request is copied from disk 104 to RAM 108 (268), so that once the requested data stored in flash memory 110 is finished playing, the audio player can begin playing data from RAM 108 using the procedure set forth in FIG. 3, thus preventing any interruption in play. If the requested data is not contained in flash memory 110, then the requested block is copied from disk 104 to RAM 108 (268) and played according to the play procedure shown in FIG. 3 (270).

Thus, the present invention minimizes the amount of time a user must wait to receive audio output after turning the system on. If the requested data is found in flash memory 110, it can be played immediately, while the remainder of the user's request is copied into RAM 108, thus rendering the step of copying data into RAM 108 transparent to the user.

In one embodiment, the present invention enables a user to skip to tracks of data that are not stored in RAM 108 and begin listening to them without waiting for data to be transferred from disk 104 to RAM 108. For example, in this embodiment, the system maintains a list of the N (e.g., 10 or 20 or 100) tracks last played by the user, and the flash memory 110 stores the first fifteen seconds of each track in that list. Accordingly, when the user asks to play a selected track of data, the play control logic can first check to see if that data is stored in the flash memory unit before copying data for the selected track from disk 104 to RAM 108. Thus, steps 242 and 244 of the power down procedure, for predicting data the user will want to play and storing it in the flash memory, may also be implemented in the play procedure or elsewhere in the system's control logic.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. An audio player, comprising:

a first memory unit;

a non-volatile memory buffer;

fast-start logic for copying a predefined amount of audio data from the first memory unit into the non-volatile memory buffer under predefined conditions before the audio player is turned off, and for playing the audio data stored in the non-volatile memory buffer when the audio player is commanded to resume playing;

wherein the first memory unit has a longer data access time than a data access time associated with the non-volatile memory buffer;

whereby the fast-start logic enables the audio player to resume playing audio data within a time period corresponding to the data access time associated with the non-volatile memory buffer upon receiving a command to resume playing after the audio player has been turned off.

2. The audio player of claim 1, wherein the audio data is compressed; and the audio player further includes:
  a compressed audio data converter for converting compressed audio data in the first memory unit into a decompressed audio signal; and
  a communications port for transmitting the decompressed audio signal to a user.

3. The audio player of claim 1, wherein the first memory unit has storage capacity greater than storage capacity of the non-volatile memory buffer, and the first memory unit comprises a hard disk drive that is powered off when the audio player is turned off and the non-volatile memory buffer comprises a flash EEPROM.

4. The audio player of claim 1, wherein said first memory unit comprises a non-volatile memory unit and a volatile memory unit.

5. The audio player of claim 4 further comprising:
  play control logic for copying audio data from the non-volatile memory unit into the volatile memory unit while said fast start logic is playing the audio data stored in the non-volatile memory buffer, and for playing, without interruption, the audio data stored in the volatile memory unit when the fast start logic finishes playing the audio data stored in the non-volatile memory buffer.

6. The audio player of claim 1, further including:
  play control logic for playing, without interruption, audio data stored in the first memory unit when the fast start logic finishes playing the audio data stored in the non-volatile memory buffer.

7. A multimedia player, comprising:
  a first memory unit;
  a non-volatile memory buffer;
  fast-start logic for copying a predefined portion of multimedia data from said first memory unit into said non-volatile memory buffer upon the occurrence of a first predefined condition, and for playing the multimedia data stored in said non-volatile memory buffer upon the occurrence of a second predefined condition;
  wherein the first memory unit has a longer data access time than a data access time associated with the non-volatile memory buffer;
  whereby the fast-start logic enables the multimedia player to resume playing multimedia data within a time period corresponding to the data access time associated with the non-volatile memory buffer upon the occurrence of the second predefined condition.

8. The multimedia player of claim 7, wherein said multimedia data comprises compressed audio data.

9. The multimedia player of claim 7, wherein said multimedia data comprises audio-visual data.

10. The multimedia player of claim 7, wherein said first predefined condition comprises a command to turn off the multimedia player, and wherein said second predefined condition comprises a command to resume playing multimedia data.

11. The multimedia player of claim 7, further comprising:
  play control logic, wherein said first memory unit comprises a non-volatile memory unit and a volatile memory unit, said play control logic for copying multimedia data from the non-volatile memory unit into the volatile memory unit while said fast start logic is playing the multimedia data stored in the non-volatile memory buffer.

12. A method of reducing data-retrieval latency in an audio player, comprising:
  detecting a first predefined condition;
  copying a predefined portion of audio data from a first memory unit into a non-volatile memory buffer upon detection of the first predefined condition; the first memory unit having a longer data access time than a data access time associated with the non-volatile memory buffer;
  detecting a second predefined condition; and
  playing the audio data stored in said non-volatile memory buffer upon detection of the second predefined condition;
  whereby the audio player begins playing audio data within a time period corresponding to the data access time associated with the non-volatile memory buffer upon the occurrence of the second predefined condition.

13. The method of claim 12, wherein said first predefined condition comprises a command to turn off the audio player, and wherein said second predefined condition comprises a command to resume playing audio data.

14. The method of claim 12, wherein said first predefined condition comprises an absence of user-input to the audio player for a predetermined time interval when said audio player is not playing audio data.

15. The method of claim 12, wherein the predefined portion of audio data that is copied into the non-volatile memory buffer upon detection of said first predefined condition comprises a sequence of the next data to be played by the audio player, said sequence having a predetermined length.

16. A data storage and transmission unit, comprising:
  a non-volatile memory unit;
  a volatile memory unit;
  a non-volatile memory buffer; the non-volatile memory unit having a longer data access time than a data access time associated with the non-volatile memory buffer;
  an output port for transmitting data from the volatile memory unit to an output device;
  control logic for copying data from the non-volatile memory unit into the volatile memory unit, wherein the time required to transmit the copied data is greater than the time required to copy the data from the non-volatile memory unit into the volatile memory unit; and
  fast-start logic for copying a predefined amount of data from the volatile memory unit into the non-volatile memory buffer under predefined conditions before the data storage and transmission unit is commanded to turn off, and for transmitting the predefined amount of data when the data storage and transmission unit is commanded to resume transmitting data.

17. The data storage and transmission unit of claim 16, wherein the non-volatile memory buffer has a data access time that is less than a data access time of the non-volatile memory unit.

18. A method of transmitting an audio signal with a compressed audio data player, comprising:
  playing compressed audio data stored in a memory unit, including transmitting compressed audio data from a memory unit to a data converter, converting the compressed audio data into a decompressed audio signal, and transmitting the decompressed audio signal to an output port;

detecting a first predefined condition;

copying a predefined portion of compressed audio data from the memory unit into a non-volatile memory buffer upon detection of the first predefined condition;

detecting a second predefined condition; and playing the compressed audio data stored in said non-volatile memory buffer upon detection of the second predefined condition, and then without interruption, playing compressed audio data stored in the memory unit.

19. The method of claim 18, wherein the step of playing the compressed audio data stored in the non-volatile memory buffer further comprises:

copying the predefined portion of compressed audio data from the non-volatile memory buffer into the memory unit;

transmitting the predefined portion of compressed audio data from the memory unit to the data converter;

converting the predefined portion of compressed audio data into a predefined decompressed audio signal;

transmitting the predefined decompressed audio signal to the output port.

20. A method of operating an audio player, comprising:

playing audio data stored in a first memory unit;

copying a predefined amount of audio data from the first memory unit into a non-volatile memory buffer under predefined conditions before the audio player is powered down; and after the audio player has powered down and upon receiving a resume play command, playing the audio data stored in the non-volatile memory buffer, and then without interruption, playing audio data stored in the first memory unit.

21. An audio player, comprising:

a first memory unit;

a non-volatile memory buffer;

fast-start logic for copying a predefined amount of audio data from the first memory unit into the non-volatile memory buffer under predefined conditions before the audio player is powered down, and for playing the audio data stored in the non-volatile memory buffer when the audio player is commanded to resume playing after being powered down; and play control logic for playing, without interruption, audio data stored in the first memory unit when the fast start logic finishes playing the audio data stored in the non-volatile memory buffer.

* * * * *